(12) United States Patent
Park et al.

(10) Patent No.: US 10,146,081 B2
(45) Date of Patent: Dec. 4, 2018

(54) DISPLAY DEVICE

(71) Applicant: SAMSUNG DISPLAY CO., LTD., Yongin-si, Gyeonggi-do (KR)

(72) Inventors: Seunghyun Park, Seoul (KR); Junho Song, Seongnam-si (KR); Jihyun Kim, Suwon-si (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 160 days.

(21) Appl. No.: 15/221,880

(22) Filed: Jul. 28, 2016

(65) Prior Publication Data
US 2017/0146855 A1   May 25, 2017

(30) Foreign Application Priority Data

Nov. 19, 2015   (KR) .................. 10-2015-0162265

(51) Int. Cl.
*G02F 1/1335* (2006.01)
*G09G 3/20* (2006.01)
*G09G 3/36* (2006.01)

(52) U.S. Cl.
CPC ..... *G02F 1/133514* (2013.01); *G09G 3/2003* (2013.01); *G09G 3/36* (2013.01); *G02F 1/133553* (2013.01); *G02F 2201/52* (2013.01); *G09G 2300/0426* (2013.01); *G09G 2320/0666* (2013.01)

(58) Field of Classification Search
CPC .......... G02B 5/201; G02B 5/22; G02B 5/003; G02F 1/133514; G02F 1/134336; G02F 2001/134345; G02F 2201/52

USPC .................. 359/891; 349/104, 106, 108, 109
See application file for complete search history.

(56) References Cited

U.S. PATENT DOCUMENTS

| 7,239,363 | B2* | 7/2007 | Park | G02F 1/133514 345/88 |
| 7,304,700 | B2* | 12/2007 | Park | G02F 1/133514 349/106 |
| 7,580,097 | B2* | 8/2009 | Moon | G02F 1/133555 349/104 |
| 7,688,404 | B2* | 3/2010 | Park | G02F 1/133514 349/106 |
| 7,760,297 | B2* | 7/2010 | Takizawa | G02F 1/133514 349/106 |

(Continued)

FOREIGN PATENT DOCUMENTS

| JP | 2013-186414 A | 9/2013 |
| KR | 10-2010-0077979 A | 7/2010 |
| KR | 10-1064191 B1 | 9/2011 |

(Continued)

OTHER PUBLICATIONS

English machine translation of KR 20120134222 A.*

*Primary Examiner* — Nicholas R Pasko
(74) *Attorney, Agent, or Firm* — Lee & Morse, P.C.

(57) ABSTRACT

A display device, including a first substrate including at least one pixel, each pixel including first, second, third, and fourth pixels; a second substrate opposing the first substrate; and first, second, and third color filters on the second substrate corresponding to the first, second, and third pixels, respectively, the first, second, and third color filters, respectively, overlapping portions of the fourth pixel, the fourth pixel being adjacent to the first, second, and third color filters.

20 Claims, 13 Drawing Sheets

(56) References Cited

U.S. PATENT DOCUMENTS 8,804,077 B2 * 8/2014 Tatsumi ............ G02F 1/133555
349/113
2013/0242237 A1 * 9/2013 Nagato ............ G02F 1/133509
349/105

FOREIGN PATENT DOCUMENTS

KR  10-2012-0134222 A    12/2012
KR     20120134222 A  * 12/2012
WO  WO 2016149969 A1 *  9/2016  ............... G02F 1/33

* cited by examiner

230 : 230R, 230G, 230B

DISPLAY DEVICE

CROSS-REFERENCE TO RELATED APPLICATION

Korean Patent Application No. 10-2015-0162265, filed on Nov. 19, 2015, in the Korean Intellectual Property Office, and entitled: "Display Device," is incorporated by reference herein in its entirety.

BACKGROUND

1. Field

One or more embodiments described herein relate to a reflective display device.

2. Description of the Related Art

Display devices, e.g., liquid crystal display ("LCD") devices and electrophoretic display ("EPD") devices, may be widely used in place of comparative cathode ray tubes ("CRT"). Such display devices may be light-receiving-type display devices, i.e., passive-type display devices, and may require an additional light source. Display devices may be classified into transmissive display devices, which may display images using a backlight unit provided therein as a light source, and reflective display devices, which may display images using natural light as a light source absent a backlight unit.

SUMMARY

Embodiments are directed to a display device, including a first substrate including at least one pixel, each pixel including first, second, third, and fourth pixels; a second substrate opposing the first substrate; and first, second, and third color filters on the second substrate corresponding to the first, second, and third pixels, respectively, the first, second, and third color filters, respectively, overlapping portions of the fourth pixel, the fourth pixel being adjacent to the first, second, and third color filters.

The fourth pixel may be a transparent pixel.

The fourth pixel may be a white pixel.

The first, second, and third color filters may have different colors from one another, including red, green, blue, yellow, cyan, or magenta.

An overlapping area between the third color filter and the fourth pixel, an overlapping area between the first color filter and the fourth pixel, and an overlapping area between the second color filter and the fourth pixel may be substantially equal to one another.

An overlapping area between the third color filter and the fourth pixel may be larger than an overlapping area between the first color filter and the fourth pixel, and the overlapping area between the first color filter and the fourth pixel may be larger than an overlapping area between the second color filter and the fourth pixel.

The first, second, and third pixels may be red, green, and blue pixels, respectively, and the first, second, and third color filters may be red, green, and blue color filters, respectively.

The first color filter may overlap a portion of the second pixel, the second pixel being adjacent to the first color filter.

The third color filter may overlap a portion of the first pixel, the first pixel being adjacent to the third color filter.

The display device may further include a pixel electrode in each of the first pixel, the second pixel, the third pixel, and the fourth pixel.

The first, second, and third color filters, respectively, may overlap portions of the pixel electrode in the fourth pixel, the fourth pixel being adjacent to the first, second, and third color filters.

An overlapping area between the pixel electrode in the fourth pixel and each of the first, second, and third color filters may be in a range of about 4% to about 47% with respect to an area of the pixel electrode in the fourth pixel.

An overlapping area between the third color filter and the pixel electrode in the fourth pixel, an overlapping area between the first color filter and the pixel electrode in the fourth pixel, and an overlapping area between the second color filter and the pixel electrode in the fourth pixel may be substantially equal to one another.

An overlapping area between the third color filter and the pixel electrode in the fourth pixel may be larger than an overlapping area between the first color filter and the pixel electrode in the fourth pixel, and the overlapping area between the first color filter and the pixel electrode in the fourth pixel may be larger than an overlapping area between the second color filter and the pixel electrode in the fourth pixel.

The pixel electrode may include a conductive material having reflectivity.

The plurality of pixels may be arranged in a matrix, the pixels being on the first substrate, the first, second, third, and fourth pixels may be arranged in a 2×2 matrix, and the first pixel and the second pixel may be sequentially arranged in a first row, and the third pixel and the fourth pixel may be sequentially arranged in a second row, the second row being adjacent to the first row.

Embodiments are directed to a display device, including a first substrate including at least one pixel, each pixel including first, second, third, and fourth pixels; a second substrate opposing the first substrate; and first, second, and third color filters on the first substrate corresponding to the first, second, and third pixels, respectively, the first, second, and third color filters, respectively, overlapping portions of the fourth pixel, the fourth pixel being adjacent to the first, second, and third color filters.

The display device may further include a pixel electrode in each of the first pixel, the second pixel, the third pixel, and the fourth pixel.

The first, second, and third color filters, respectively, may overlap portions of the pixel electrode in the fourth pixel, the fourth pixel being adjacent to the first, second, and third color filters.

An overlapping area between the pixel electrode in the fourth pixel and each of the first, second, and third color filters may be in a range of about 4% to about 47% with respect to an area of the pixel electrode in the fourth pixel.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
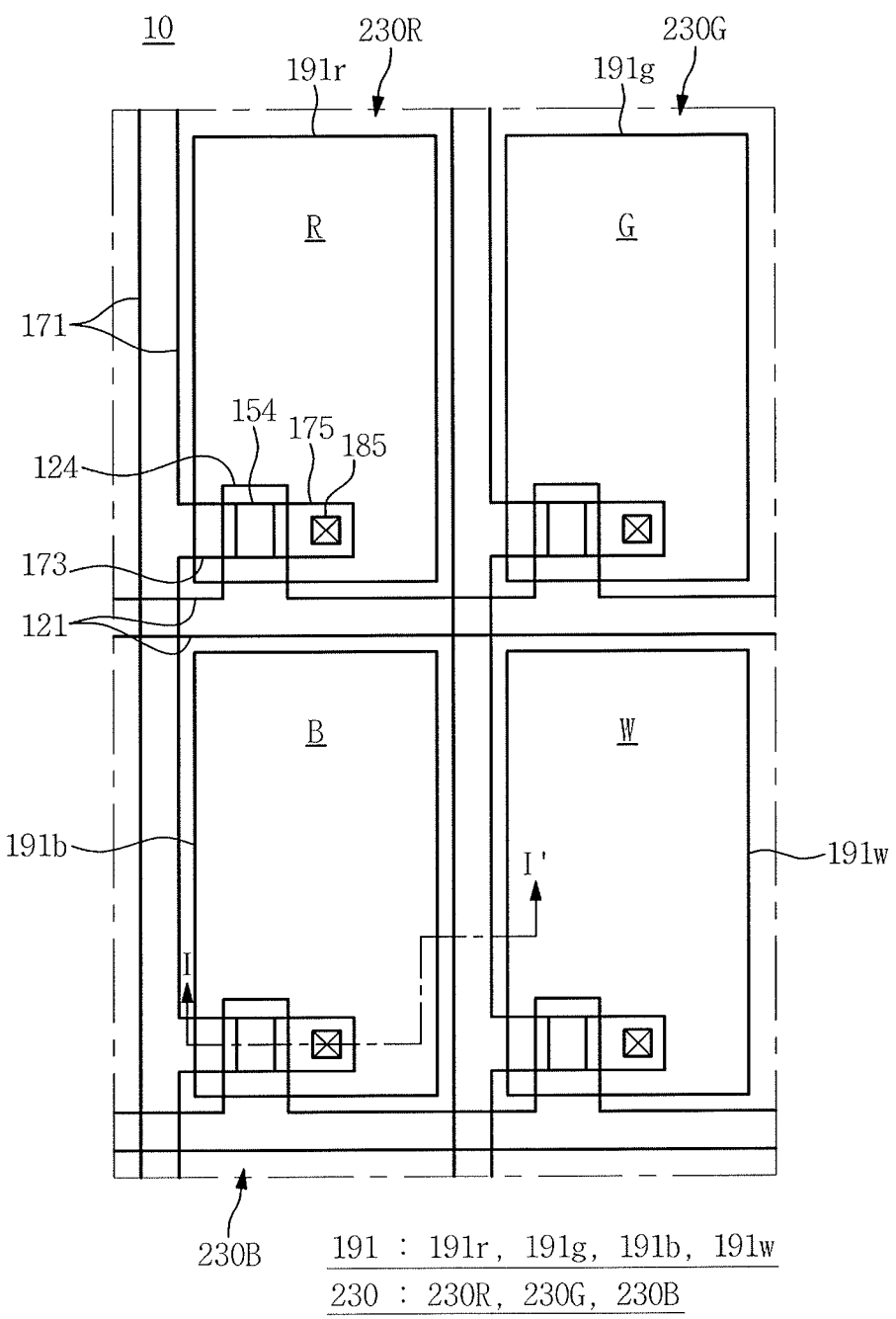
FIG. 1 illustrates a schematic plan view of a pixel according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when an element (e.g., a layer) is referred to as being "on" another element or substrate, it can be directly on the other element or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device disposed "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

All terminologies used herein are merely used to describe the exemplary embodiments and may be modified according to the relevant art. Therefore, the terms used herein should be interpreted as having a meaning that is consistent with their meanings in the context of the present disclosure, and is not intended to limit. As used herein, the singular forms "a," "an," and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by one of skill in the art to which this disclosure belongs. It will be further understood that terms, such as those defined in commonly used dictionaries, should be interpreted as having a meaning that is consistent with their meaning in the context of the relevant art, and will not be interpreted in an idealized or overly formal sense unless expressly so defined herein.

Hereinafter, an exemplary embodiment of a display device will be described with reference to FIGS. 1, 2, 3, 4, and 5. By way of example, the display device according to the exemplary embodiment will be described with respect to a reflective liquid crystal display ("LCD") device. Unless otherwise indicated, it is assumed that the LCD device according to the exemplary embodiment is a reflective LCD device.

One or more pixels may each include first, second, third, and fourth pixels. The first, second, and third pixels may have different colors from one another, including, e.g., red, green, and blue. For ease of description, it is hereinafter assumed that the first pixel, the second pixel, and the third pixel are a red pixel, a green pixel, and a blue pixel, respectively.

The fourth pixel may be a transparent pixel or a white pixel. For ease of description, it is hereinafter assumed that the fourth pixel is a white pixel.

First, second, and third color filters may have different colors from one another, including, e.g., red, green, blue, yellow, cyan, and magenta. For ease of description, it is hereinafter assumed that the first color filter, the second color filter, and the third color filter are a red color filter, a green color filter, and a blue color filter, respectively.

Figure 2:
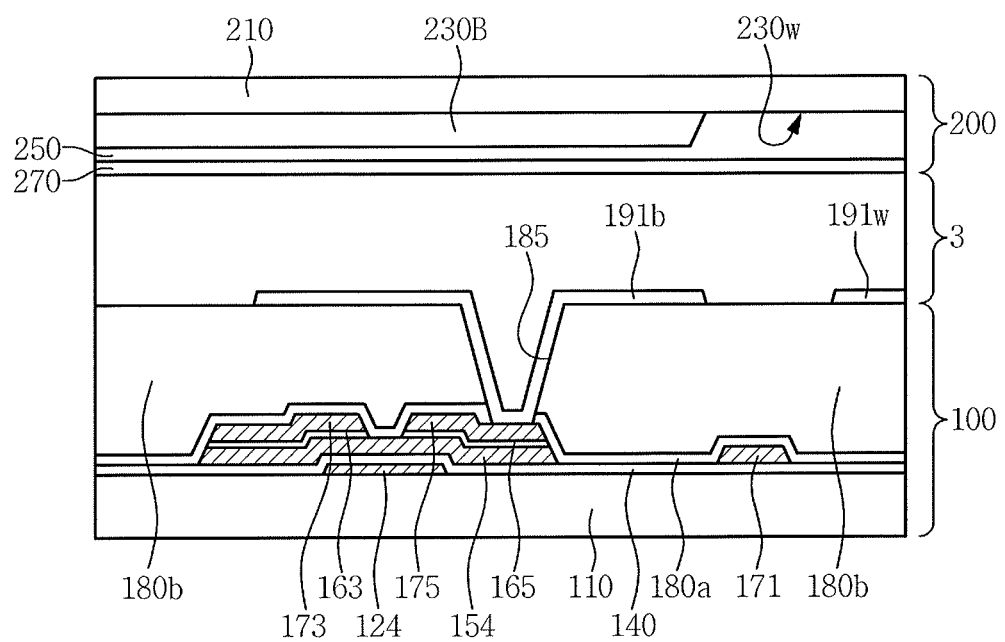
FIG. 2 illustrates a cross-sectional view taken along line I-I' of FIG. 1.
Figure 3:
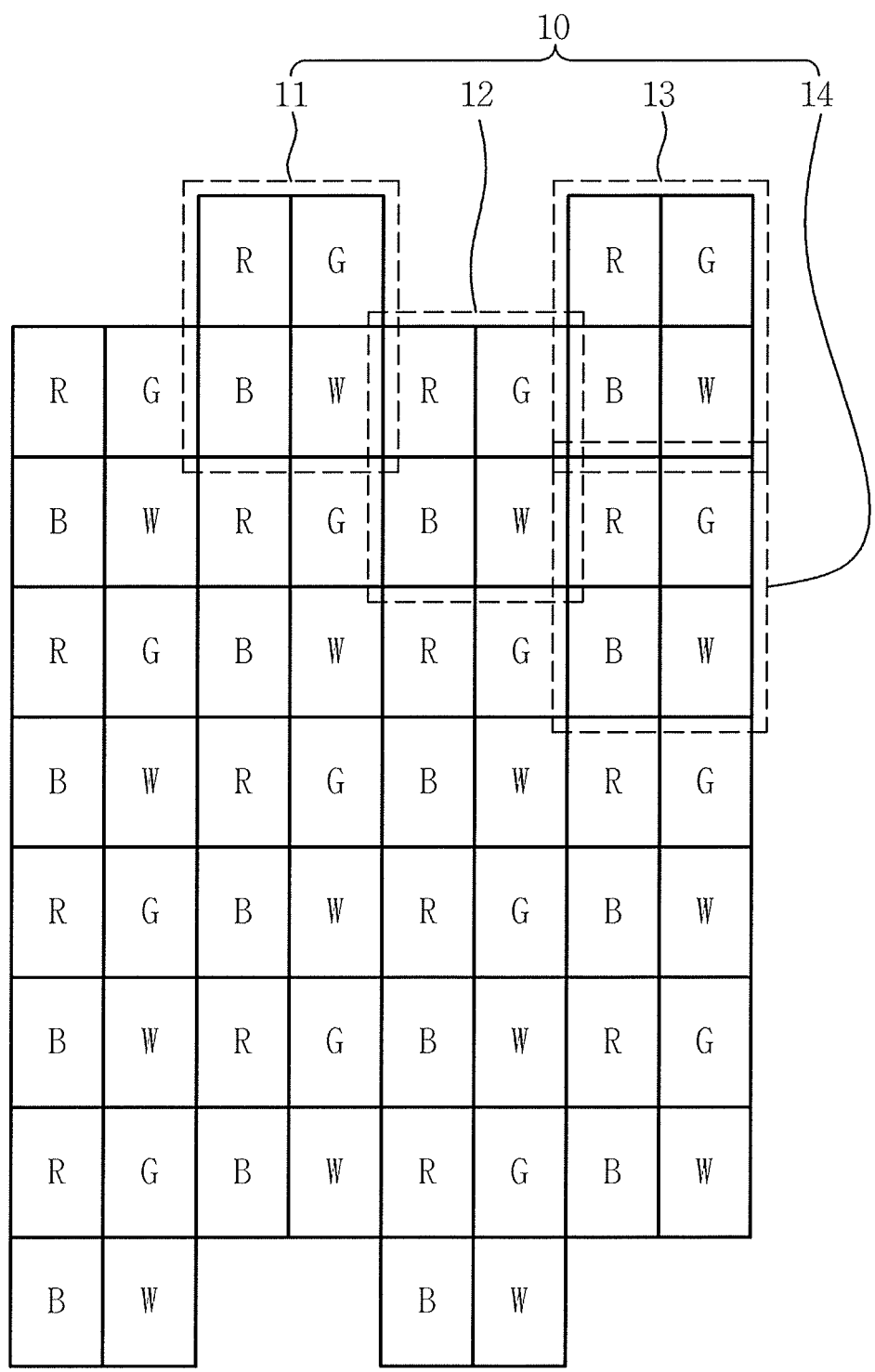
FIG. 3 illustrates a schematic plan view of an array of a plurality of pixels according to the exemplary embodiment of FIG. 1.

FIG. 1 illustrates a schematic plan view of a pixel according to an exemplary embodiment. FIG. 2 illustrates a cross-sectional view taken along line I-I' of FIG. 1. FIG. 3 illustrates a schematic plan view of an array of a plurality of pixels according to the exemplary embodiment. Referring to FIGS. 1, 2, and 3, the LCD device according to an exemplary embodiment may include one or more pixels 10. The plurality of pixels 10 may be arranged on a first substrate 110 in a matrix including a plurality of rows and a plurality of columns. The pixel 10 may include a red pixel R, a green pixel G, a blue pixel B, and a white pixel W. As illustrated in FIG. 1, for example, the red pixel R, the green pixel G, the blue pixel B, and the white pixel W may be arranged in a 2×2 matrix to define one pixel 10. The red pixel R and the green pixel G may be sequentially arranged in a first row, and the blue pixel B and the white pixel W may be sequentially arranged in a second row adjacent to the first row.

The array structure of the plurality of pixels 10 will be described in detail hereinafter with reference to FIG. 3. As illustrated in FIG. 3, the plurality of pixels 10 may be arranged. Vertically adjacent ones of the plurality of pixels 10 may have the same matrix structure as one another. One of every two horizontally adjacent ones of the pixels 10 may be transposed in a column direction by one row, and the two pixels 10 may be diagonally arranged, e.g., with respect, to one another. For example, the pixels 10 may include a first pixel 11, a second pixel 12, a third pixel 13, and a fourth pixel 14. The second pixel 12 may be disposed at the right side of the first pixel 11 and may be transposed in the column direction by one row, the first pixel 11 and the second pixel 12 may be diagonally arranged, e.g., with respect, to one another, and a white pixel W of the first pixel 11 and a red pixel R of the second pixel 12 may be adjacent to one another. The third pixel 13 and the fourth pixel 14 may be disposed at the right side of the second pixel 12 and may be respectively transposed in the column direction by one row, each of the third pixel 13 and the fourth pixel 14 may be arranged diagonally to the second pixel 12, and a green pixel G of the second pixel 12 and a blue pixel B of the third pixel 13 may be adjacent to one another, and a white pixel W of the second pixel 12 and a red pixel R of the fourth pixel 14 may be adjacent to one another.

In the pixel array structure described hereinabove, with respect to the white pixel W, the green pixels G may be disposed at the upper and lower sides thereof, respectively, the blue pixel B may be disposed at the left side thereof, and the red pixel R may be disposed at the right side thereof.

The plurality of pixels 10 may have the same structure as one another. For ease of description, one of the pixels 10 will be described by way of example hereinafter. In an exemplary embodiment, the pixel 10 may be illustrated as having a 2×2 matrix structure. In an embodiment, the shape of the pixel 10 may be modified into any suitable shape including, e.g., a linear shape, a V-like shape, or a Z-like shape.

Gate lines 121 and data lines 171 may be arranged in a matrix to define the plurality of pixels 10. A pixel electrode 191 may include a conductive material that may have reflectivity. For example, the pixel electrode 191 may include a metal that may have relatively high reflectivity. The pixel electrode 191 may serve as a reflective electrode as well as a general pixel electrode. Hereinafter, for ease of description, the red pixel R, the green pixel G, and the blue pixel B will be collectively referred to as color pixels.

The LCD device configured as described hereinabove may operate as a reflective display device. In the LCD device, natural light or ambient light incident on the LCD device may reflect off the pixel electrode 191, which may have reflectivity, to be transmitted through a liquid crystal layer 3, and an image may be displayed.

Respective components included in the LCD device will be described in greater detail with reference to FIG. 2. Referring to FIG. 2, the LCD device may include a lower display panel 100 and an upper display panel 200 opposing one another, and the liquid crystal layer 3. The liquid crystal layer 3 may be interposed between the lower and upper display panels 100 and 200.

Hereinafter, the lower display panel 100 will be described.

The plurality of gate lines 121 may be disposed on the first substrate 110.

The gate lines 121 may transmit gate signals and may extend substantially in a transverse direction. Each of the gate lines 121 may include a plurality of gate electrodes 124.

A gate insulating layer 140 may be disposed on the gate line 121. The gate insulating layer 140 may include an inorganic insulating material, e.g., silicon nitride ($SiN_x$) or silicon oxide ($SiO_x$).

A plurality of semiconductors 154 may be disposed on the gate insulating layer 140. Each of the plurality of semiconductors 154 may include a protrusion extending along the gate electrode 124. In an exemplary embodiment, the semiconductor 154 may be disposed only on the gate electrode 124.

The semiconductor 154 may include, e.g., amorphous silicon, polycrystalline silicon, or an oxide semiconductor. The semiconductor 154 may be an oxide semiconductor, and the oxide semiconductor may include one or more of, e.g., zinc (Zn), gallium (Ga), indium (In), or tin (Sn).

For example, the oxide semiconductor may include an oxide semiconductor material such as oxide based on, e.g., Zn, Ga, Sn, or In, or composite oxide, e.g., zinc oxide (ZnO), indium-gallium-zinc oxide ($InGaZnO_4$), indium-zinc oxide (In—Zn—O), or zinc-tin oxide (Zn—Sn—O).

In an embodiment, the oxide semiconductor may include, e.g., IGZO-based oxide including In, Ga, Zn, and oxygen (O). In an embodiment, the oxide semiconductor may include In—Sn—Zn—O based metal oxide, In—Al—Zn—O based metal oxide, Sn—Ga—Zn—O based metal oxide, Al—Ga—Zn—O based metal oxide, Sn—Al—Zn—O based metal oxide, In—Zn—O based metal oxide, Sn—Zn—O based metal oxide, Al—Zn—O based metal oxide, In—O based metal oxide, Sn—O based metal oxide, and Zn—O based metal oxide.

A plurality of ohmic contact members 163 and 165 may be disposed on the semiconductor 154 and the protrusion of the semiconductor 154. The ohmic contact members 163 and 165 may be disposed on the semiconductor 154, in pairs that may oppose one another with respect to the gate electrode 124.

The ohmic contact members 163 and 165 may include, e.g., silicide, or n+ hydrogenated amorphous silicon doped with n-type impurities at high concentration, e.g., phosphorus.

A data conductor including the plurality of data lines 171 and a plurality of drain electrodes 175 may be disposed on the ohmic contact members 163, and 165.

The data lines 171 may transmit data signals and may extend substantially in a longitudinal direction to intersect the gate lines 121. Each of the data lines 171 may include a plurality of source electrodes 173 extending toward the gate electrodes 124.

The drain electrode 175 may have one end portion that may have a bar shape that may opposes the source electrode 173 with respect to the gate electrode 124 and another end portion that may have a relatively wide planar area.

The gate electrode 124, the source electrode 173, and the drain electrode 175, along with the semiconductor 154, may collectively define a thin film transistor. The semiconductor 154 may have substantially the same planar shape as a planar shape of the source electrode 173, the drain electrode 175, and the ohmic contact members 163, and 165 below the data line 171 and the drain electrode 175.

A first insulating layer 180a may be disposed on the data conductor, e.g., on the data line 171 and the drain electrode 175, and on an exposed portion of the semiconductor 154. The first insulating layer 180a may include an organic insulating material or an inorganic insulating material. In an exemplary embodiment, the first insulating layer 180a may be omitted.

A second insulating layer 180b may be disposed on the first insulating layer 180a. The second insulating layer 180b may include an organic material. The second insulating layer 180b may be disposed on the gate line 121, the data line 171, and the thin film transistor.

The pixel electrode 191 may be disposed on the second insulating layer 180b. The pixel electrode 191 may be electrically connected to the drain electrode 175 through a contact hole 185, and the pixel electrode 191 may receive a data voltage. The pixel electrode 191, which may receive the data voltage, may generate an electric field in the liquid crystal layer 3, along with a common electrode 270, which may receive a common voltage. The pixel electrodes 191 may include pixel electrodes 191r, 191g, and 191b disposed in corresponding ones of the color pixels, respectively, and a pixel electrode 191w disposed in the white pixel W. The pixel electrode 191 may include a conductive material that may have reflectivity.

Hereinafter, the upper display panel 200 will be described.

Color filters 230 may include a red color filter 230R, a green color filter 230G, and a blue color filter 230B. The red color filter 230R, the green color filter 230G, and the blue color filter 230B may be disposed on a second substrate 210 corresponding to the red pixel R, the green pixel G, and the blue pixel B, respectively. A light blocking member, also referred to as a black matrix, may be omitted herein, and adjacent ones of the color filters 230 may overlap one another at a boundary therebetween. In an exemplary embodiment, the color filters 230 may define an aperture 230w, corresponding to the white pixel W. The aperture 230w may be defined corresponding to the white pixel W, and the white pixel W may serve as a transparent pixel. In an exemplary embodiment, a white color filter may be disposed in the aperture 230w. Each of the color filters 230 may distinctly display one of a plurality of primary colors. The primary colors may include, e.g., the colors of red, green, and blue or the colors of yellow, cyan, and magenta. The color filters 230 may include an organic material.

An overcoat layer 250 may be disposed over the color filter 230. The overcoat layer 250 may be disposed in the aperture 230w. The overcoat layer 250 may prevent the exposure of the color filter 230 and may provide a planarized surface. In an exemplary embodiment, the overcoat layer 250 may be omitted.

The common electrode 270 may be disposed on the overcoat layer 250. The common electrode 270 may include a transparent conductive material, e.g., indium-tin oxide ("ITO") or indium-zinc oxide ("IZO"). The common electrode 270 may have a planar shape, and may be provided, e.g., as a whole plate that may extend over substantially an entire surface of the second substrate 210.

Alignment layers may be disposed on inner surfaces of the lower and upper display panels 100 and 200, respectively. Polarizers may be disposed on outer surfaces of the lower and upper display panels 100 and 200, respectively. Respective polarization axes of the two polarizers may be perpendicular or parallel to one another. In a reflective LCD device, one of the two polarizers may be omitted.

The liquid crystal layer 3 between the lower and upper display panels 100 and 200 may include liquid crystal molecules. Each of the liquid crystal molecules may have a major axis that may be aligned to be parallel to respective surfaces of the lower and upper display panels 100 and 200 in a state in which an electric field is not generated in the liquid crystal layer 3.

The liquid crystal layer 3 may have positive dielectric anisotropy or negative dielectric anisotropy. Each of the liquid crystal molecules of the liquid crystal layer 3 may be aligned to have a pretilt in a predetermined orientation, and the pretilt orientation of the liquid crystal molecules may vary based on the dielectric anisotropy of the liquid crystal layer 3.

The pixel electrode 191 to which the data voltage may be applied, along with the common electrode 270 to which the common voltage may be applied, may generate an electric field in the liquid crystal layer 3. The electric field in the liquid crystal layer 3 may determine the orientation of the liquid crystal molecules to display a corresponding image.

The structure of the white pixel W and the color filter 230 in the display device configured as described above will be described in greater detail hereinafter with reference to FIGS. 4 and 5.

Figure 4:
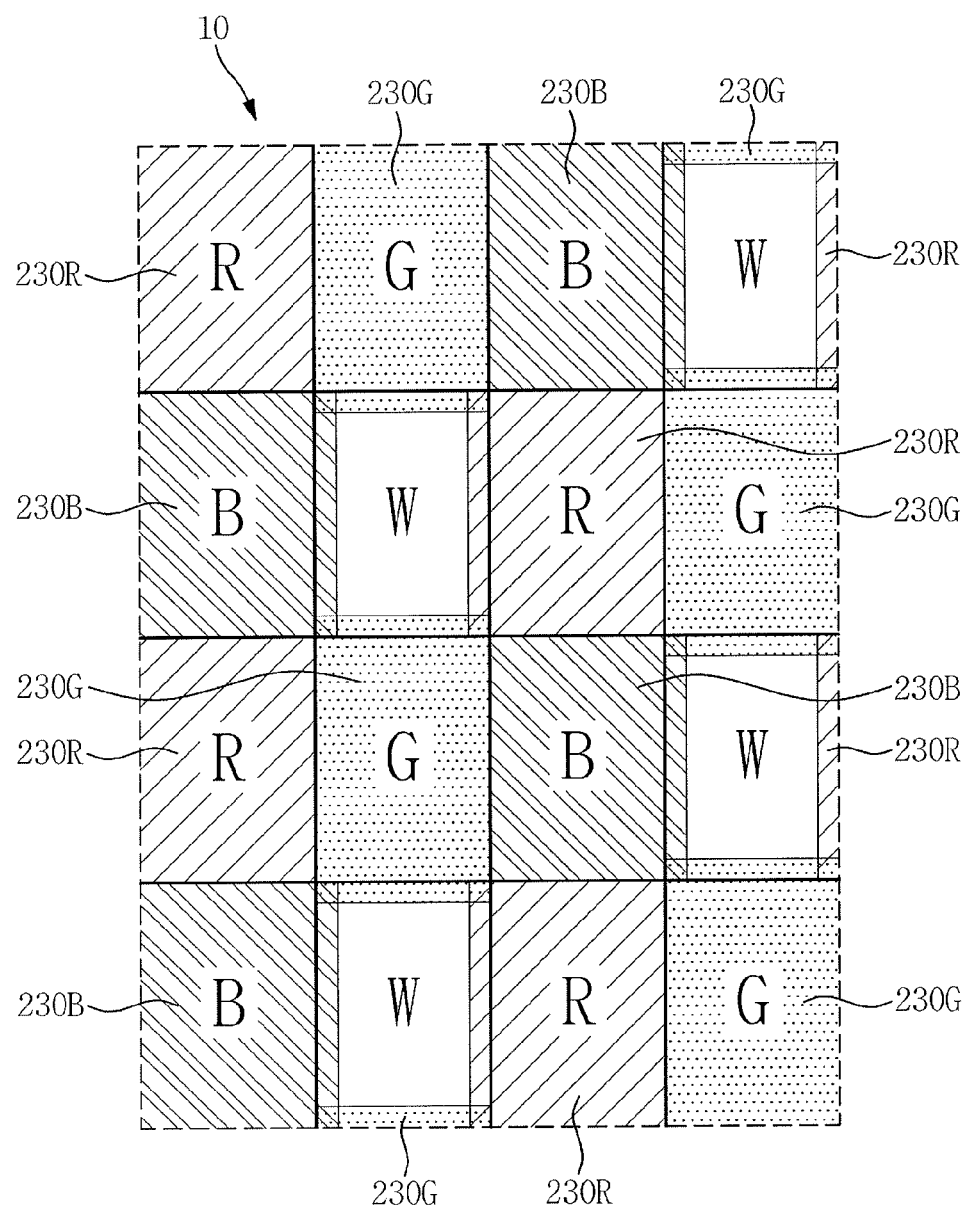
FIG. 4 illustrates a schematic plan view of a plurality of pixels and color filters according to the exemplary embodiment of FIG. 1.
Figure 5:
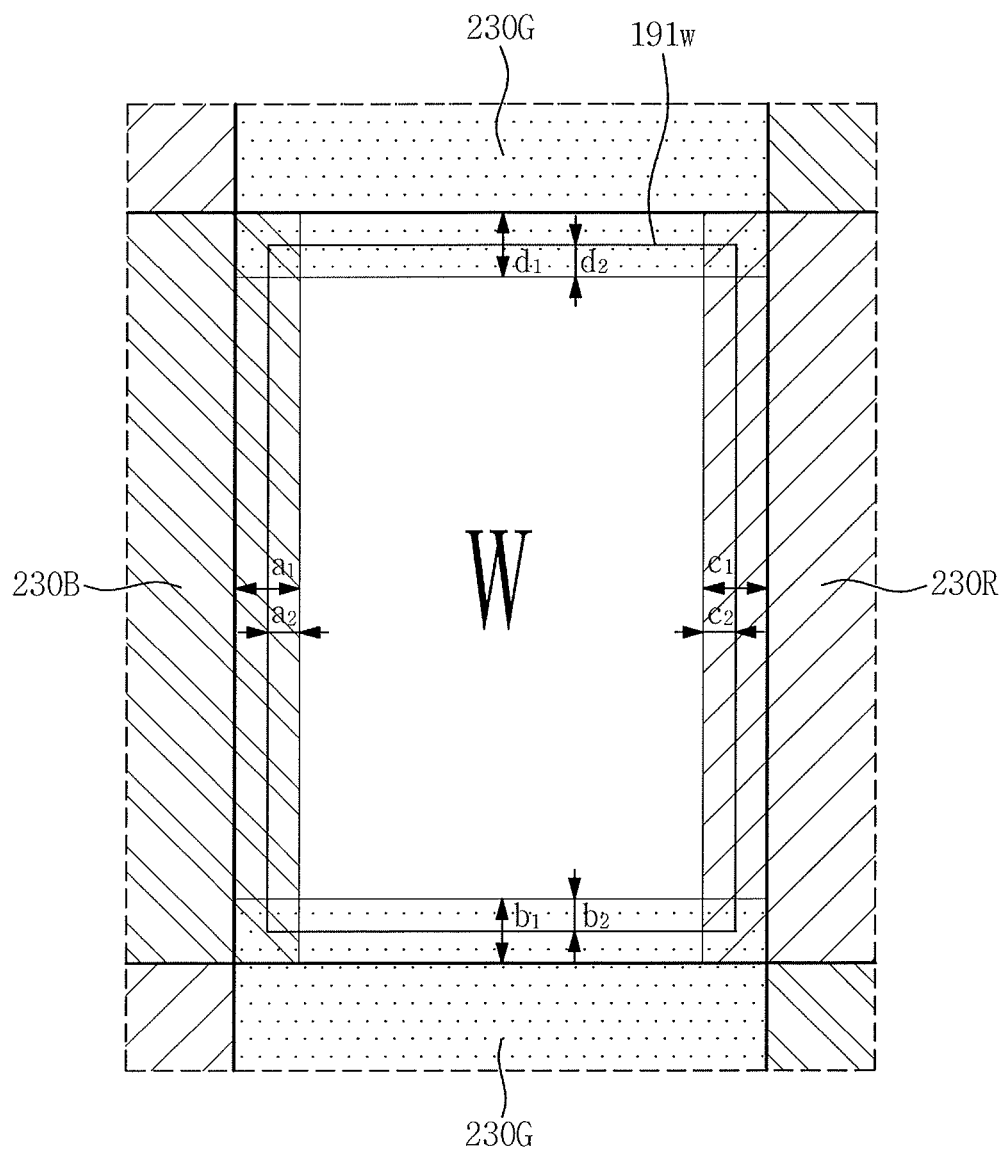
FIG. 5 illustrates an enlarged plan view of one of white pixels of FIG. 4.

FIG. 4 illustrates a schematic plan view of an array of a plurality of pixels and color filters according to the exemplary embodiment. FIG. 5 illustrates an enlarged plan view of one of white pixels of FIG. 4. Referring to FIGS. 4 and 5, in an exemplary embodiment, the red color filter 230R, the green color filter 230G, and the blue color filter 230B may respectively overlap portions of the white pixel W, the white pixel W being adjacent to the red, green, and blue color filters 230R, 230G, and 230B. As previously described, with respect to the white pixel W, the green pixels G may be disposed at the upper and lower sides thereof, the blue pixel B may be disposed at the left side thereof, and the red pixel R may be disposed at the right side thereof, and the color filters 230 adjacent to the white pixel W overlap portions of the white pixel W, respectively. As illustrated in FIG. 5, for example, the color filters 230 adjacent to the white pixel W may extend toward the white pixel W, and may overlap portions, e.g., edges, of the white pixel W, respectively.

An overlapping area a1 between the blue color filter 230B and the white pixel W, an overlapping area c1 between the red color filter 230R and the white pixel W, and each of overlapping areas b1 and d1, each of which may be between the green color filter 230G and the white pixel W, are substantially the same as, e.g., substantially equal to, one another.

In an exemplary embodiment, the color filters 230 adjacent to the white pixel W may respectively overlap portions of the pixel electrode 191w disposed in the white pixel W. As illustrated in FIG. 5, for example, the color filters 230 adjacent to the white pixel W may extend toward the white pixel W, and may respectively overlap portions, e.g., edges, of the pixel electrode 191w disposed in the white pixel W.

An overlapping area a2 between the blue color filter 230B and the pixel electrode 191w disposed in the white pixel W, an overlapping area c2 between the red color filter 230R and the pixel electrode 191w disposed in the white pixel W, and each of overlapping areas b2 an d2, each of which may be between the green color filter 230G and the pixel electrode 191w disposed in the white pixel W, are substantially the same as, e.g., substantially equal to, one another.

Each of the overlapping areas a2, b2, c2, and d2, each of which may be between the color filter 230 and the pixel electrode 191w disposed in the white pixel W, may be in a range of about 4 percent (%) to about 47% with respect to the area of the pixel electrode 191w and based on the resolution of the display device.

The color filters 230 may be arranged in the above-described manner, and the color reproduction capability of the display device may be enhanced, and the color filters 230 may each overlap the white pixel W, and the mixture of white light and colored light that may be caused by an alignment error of the color filter 230 may be prevented.

When the luminance of light is measured in a reflective display device, the luminance of white light may be the highest, and the luminance of light may decrease in the sequence of green light, red light, and blue light (i.e., white light>green light>red light>blue light). The overlapping area a1 between the blue color filter 230B and the white pixel W may be greater than, e.g., larger than, the overlapping area c1 between the red color filter 230R and the white pixel W, and the overlapping area c1 between the red color filter 230R and the white pixel W may be greater than, e.g., larger than, each of the overlapping areas b1 and d1, each of which may be between the green color filter 230G and the white pixel W. An overlapping area between the white pixel W and a color filter 230 corresponding to light that may have a relatively low luminance may be relatively large. The overlapping area a2 between the blue color filter 230B and the pixel electrode 191w disposed in the white pixel W may be greater than the overlapping area c2 between the red color filter 230R and the pixel electrode 191w disposed in the white pixel W, and the overlapping area c2 between the red color filter 230R and the pixel electrode 191w disposed in the white pixel W may be greater than each of the overlapping areas b2 and d2, each of which may be between the green color filter 230G and the pixel electrode 191w disposed in the white pixel W.

Hereinafter, LCD devices according to exemplary embodiments will be described with reference to FIGS. 6, 7, 8, 9, 10, 11, 12, and 13. For ease of description, the configuration of the LCD device that is the same as that described in the exemplary embodiment of FIG. 1 will be omitted.

Figure 6:
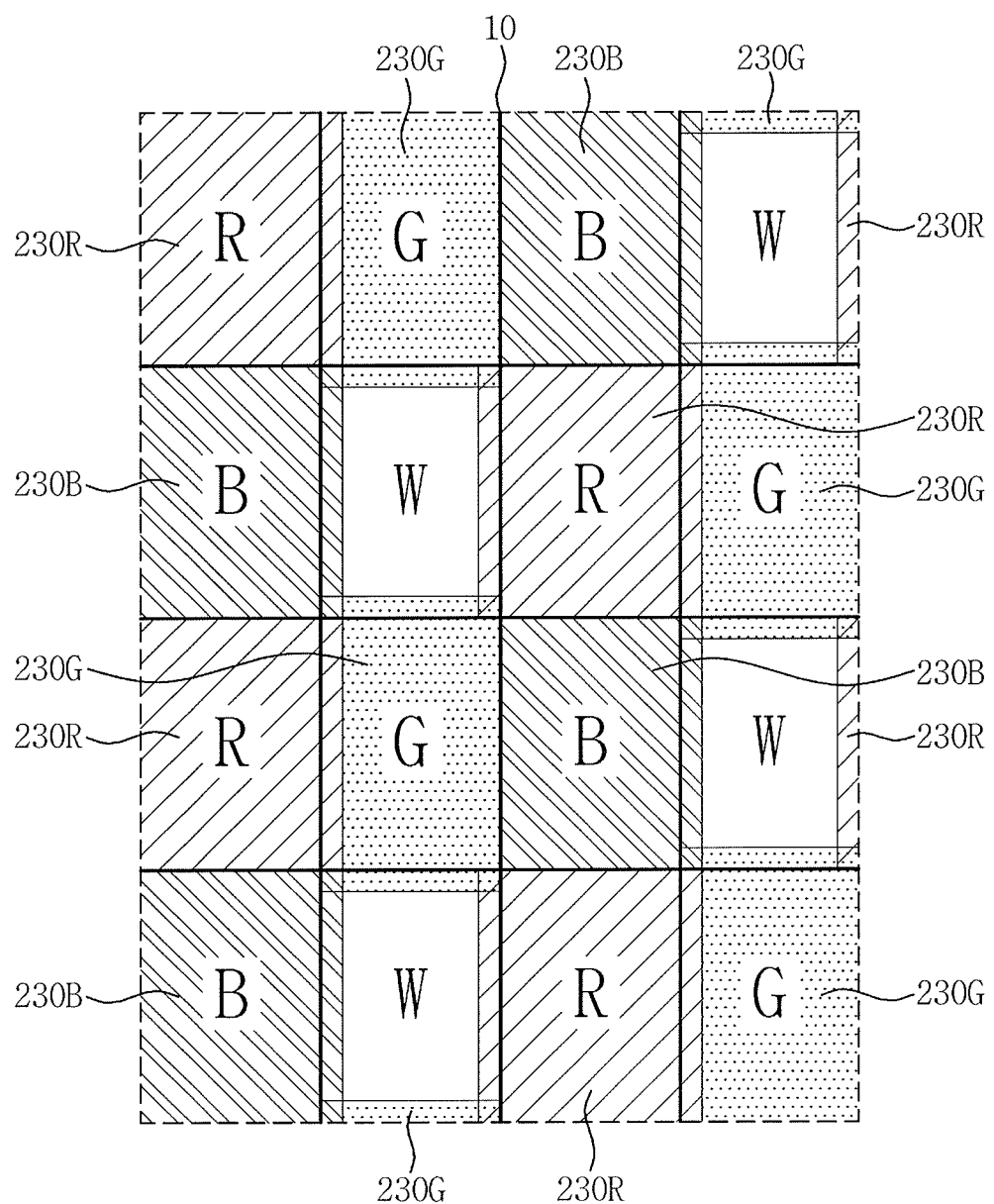
FIG. 6 illustrates a schematic plan view of a plurality of pixels and color filters according to an exemplary embodiment.
Figure 7:
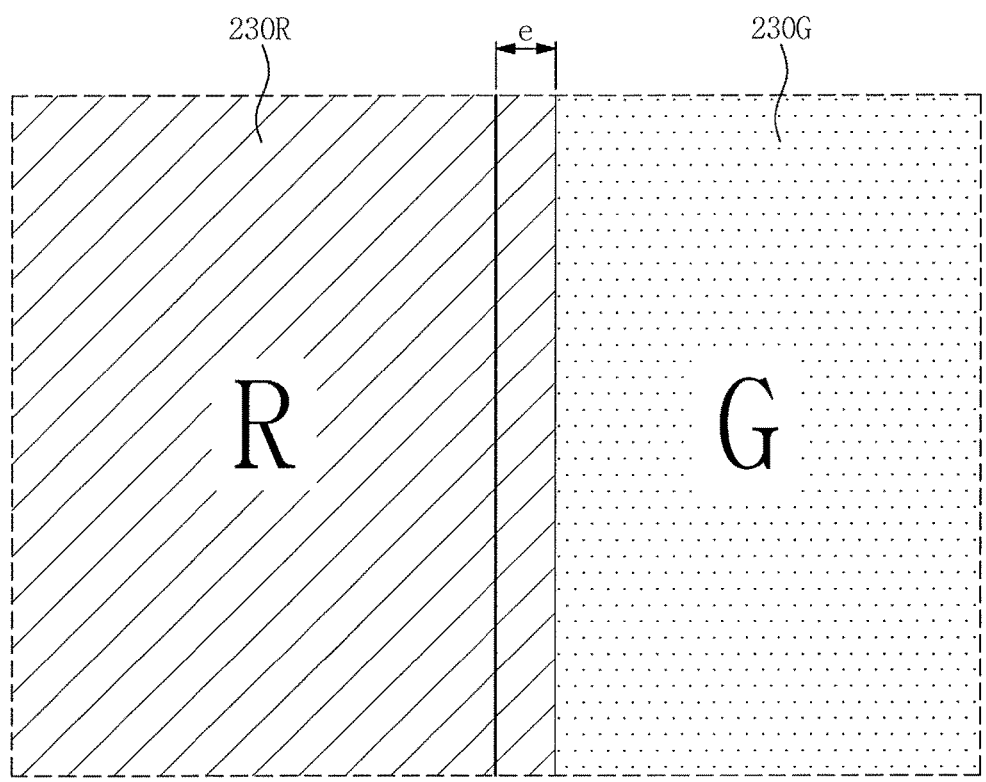
FIG. 7 illustrates an enlarged plan view of one of a plurality of pairs of adjacent red and green pixels of FIG. 6.

FIG. 6 illustrates a schematic plan view of a plurality of pixels and color filters according to an exemplary embodiment. FIG. 7 illustrates an enlarged plan view of one of a plurality of pairs of adjacent red and green pixels of FIG. 6. Referring to FIGS. 6 and 7, in a display device according to an exemplary embodiment, a red color filter 230R and a portion of a green pixel G may overlap one another. The luminance of green light may be higher than the luminance of red light, and in an exemplary embodiment, the red color filter 230R may overlap a portion of the green pixel G, the green pixel G being adjacent thereto. Only the red color filter 230R, absent a green color filter 230G, may be disposed in an overlapping area e between the red color filter 230R and the green pixel G, and as the red color filter 230R extends toward the green pixel G, the color reproducibility of red color may be enhanced.

Figure 8:
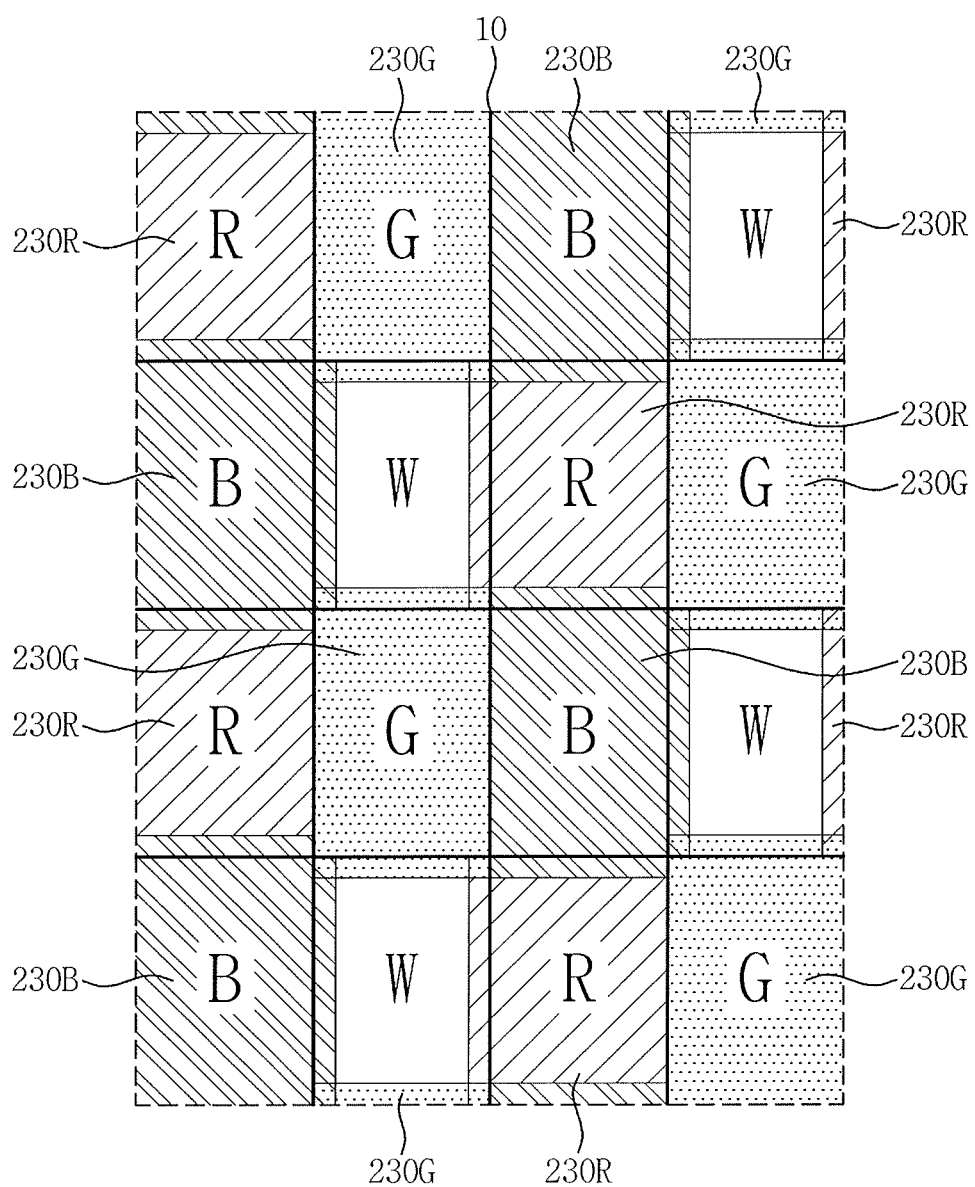
FIG. 8 illustrates a schematic plan view of a plurality of pixels and color filters according to an exemplary embodiment.
Figure 9:
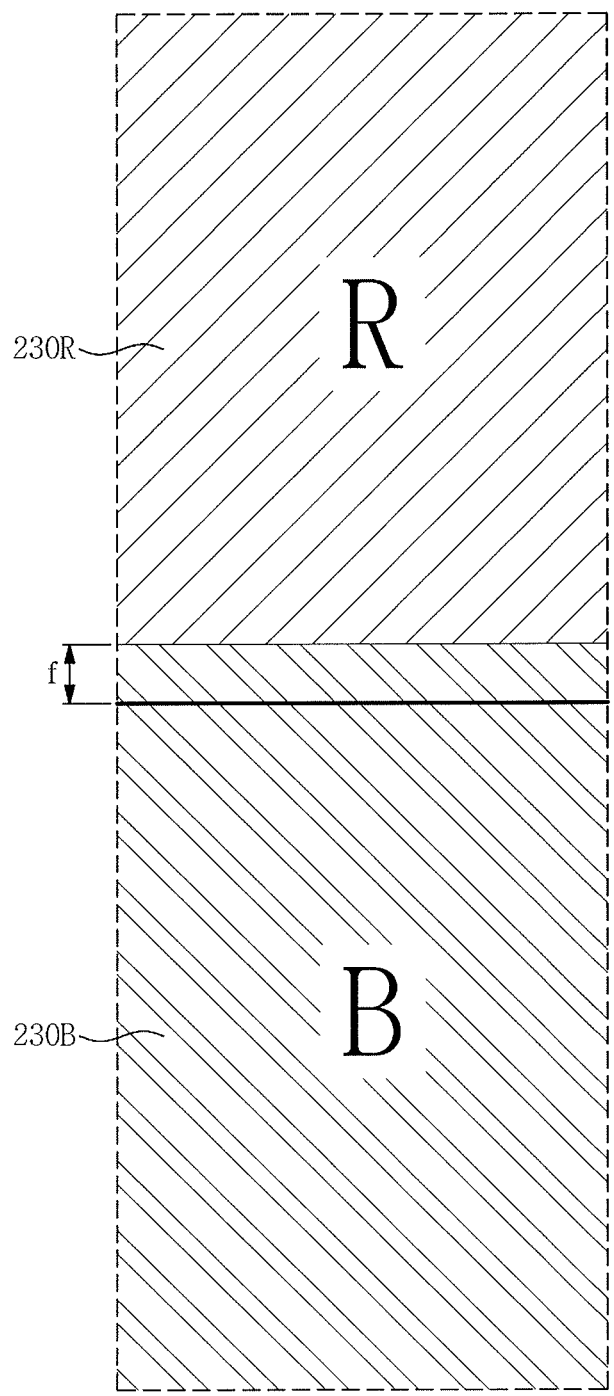
FIG. 9 illustrates an enlarged plan view of one of a plurality of pairs of adjacent red and green pixels of FIG. 8.

FIG. 8 illustrates a schematic plan view of a plurality of pixels and color filters according to an exemplary embodiment. FIG. 9 illustrates an enlarged plan view of one of a plurality of pairs of adjacent red and green pixels of FIG. 8. Referring to FIGS. 8 and 9, in a display device according to an exemplary embodiment, a blue color filter 230B and a portion of a red pixel R may overlap one another. The luminance of red light may be higher than the luminance of blue light, and in an exemplary embodiment, the blue color filter 230B may overlap a portion of the red pixel R, the red pixel R being adjacent thereto. Only the blue color filter 230B, absent a red color filter 230R, may be disposed in an overlapping area f between the blue color filter 230B and the red pixel R, and as the blue color filter 230B extends toward the red pixel R, the color reproducibility of blue color may be enhanced.

Figure 10:
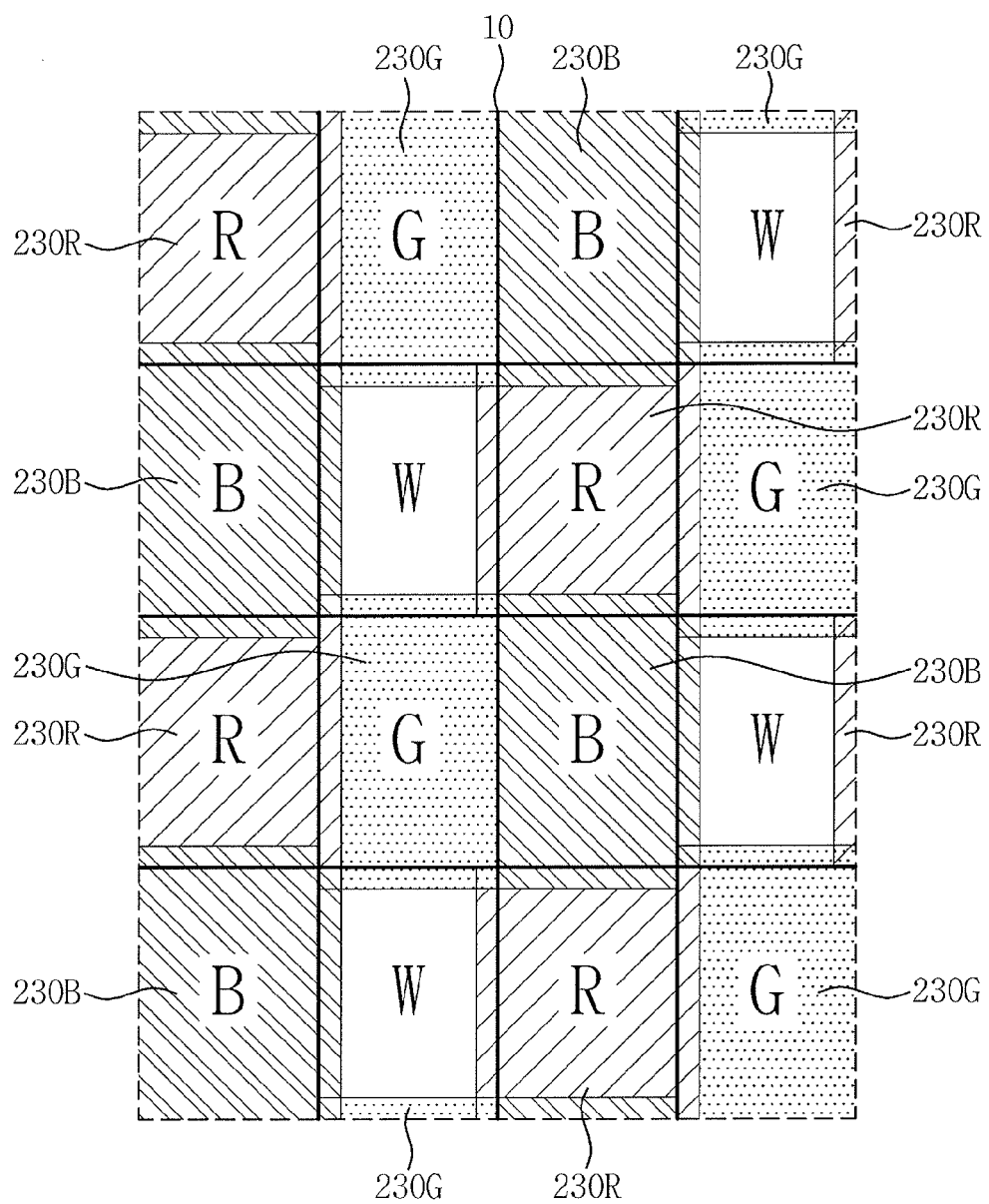
FIG. 10 illustrates a schematic plan view of a plurality of pixels and color filters according to an exemplary embodiment.

FIG. 10 illustrates a schematic plan view of a plurality of pixels and color filters according to an exemplary embodiment. Referring to FIG. 10, in a display device according to the an exemplary embodiment, a red color filter 230R and a portion of a green pixel G may overlap one another, and a blue color filter 230B and a portion of a red pixel R may overlap one another. All types of the pixel array structure described in the exemplary embodiments of FIGS. 1-9 may be included, and the color reproducibility of blue and red colors may be further enhanced than in, for example, the exemplary embodiment of FIG. 1.

Figure 11:
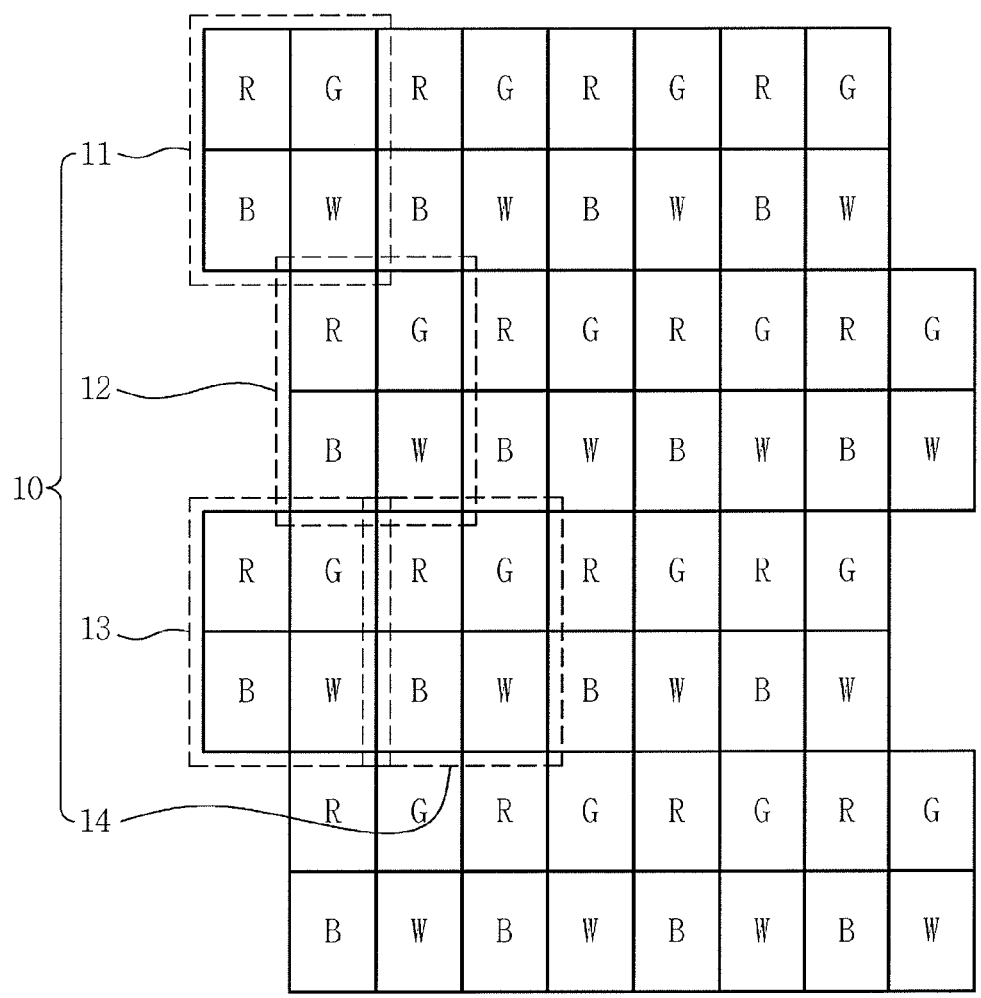
FIG. 11 illustrates a schematic plan view of an array of a plurality of pixels according to an exemplary embodiment.

FIG. 11 illustrates a schematic plan view of an array of a plurality of pixels according to an exemplary embodiment. Referring to FIG. 11, a display device according to an exemplary embodiment may have a pixel array structure different from that described in the exemplary embodiment of FIG. 1. As illustrated in FIG. 11, a plurality of pixels 10 may be arranged. Horizontally adjacent ones of the plurality of pixels 10 may have the same matrix structure as one another. One of every two vertically adjacent ones of the pixels 10 may be transposed in a row direction by one column, and the two pixels 10 may be diagonally arranged, e.g., with respect, to one another. For example, the pixels 10 may include a first pixel 11, a second pixel 12, a third pixel 13, and a fourth pixel 14. The second pixel 12 may be disposed at the lower side of the first pixel 11 and may be transposed in the row direction by one column, the second pixel 12 and the first pixel 11 may be diagonally arranged, e.g., with respect, to one another, and a white pixel W of the first pixel 11 and a red pixel R of the second pixel 12 may be adjacent to one another. The third pixel 13 and the fourth pixel 14 may be disposed at the lower side of the second pixel 12 and may be respectively transposed in the row direction by one column, and each of the third pixel 13 and the fourth pixel 14 may be diagonally arranged, e.g., with respect, to the second pixel 12, a blue pixel B of the second pixel 12 and a green pixel G of the third pixel 13 may be adjacent to one another, and a white pixel W of the second pixel 12 and a red pixel R of the fourth pixel 14 may be adjacent to one another.

In the pixel array structure described hereinabove, with respect to the white pixel W, the blue pixels B may be disposed at the left and right sides thereof, respectively, the green pixel G may be disposed at the upper side thereof, and the red pixel R may be disposed at the lower side thereof. As described in the exemplary embodiment of FIG. 1, a color filter may overlap a portion of the white pixel W, the white pixel W being adjacent to the color filter.

Figure 12:
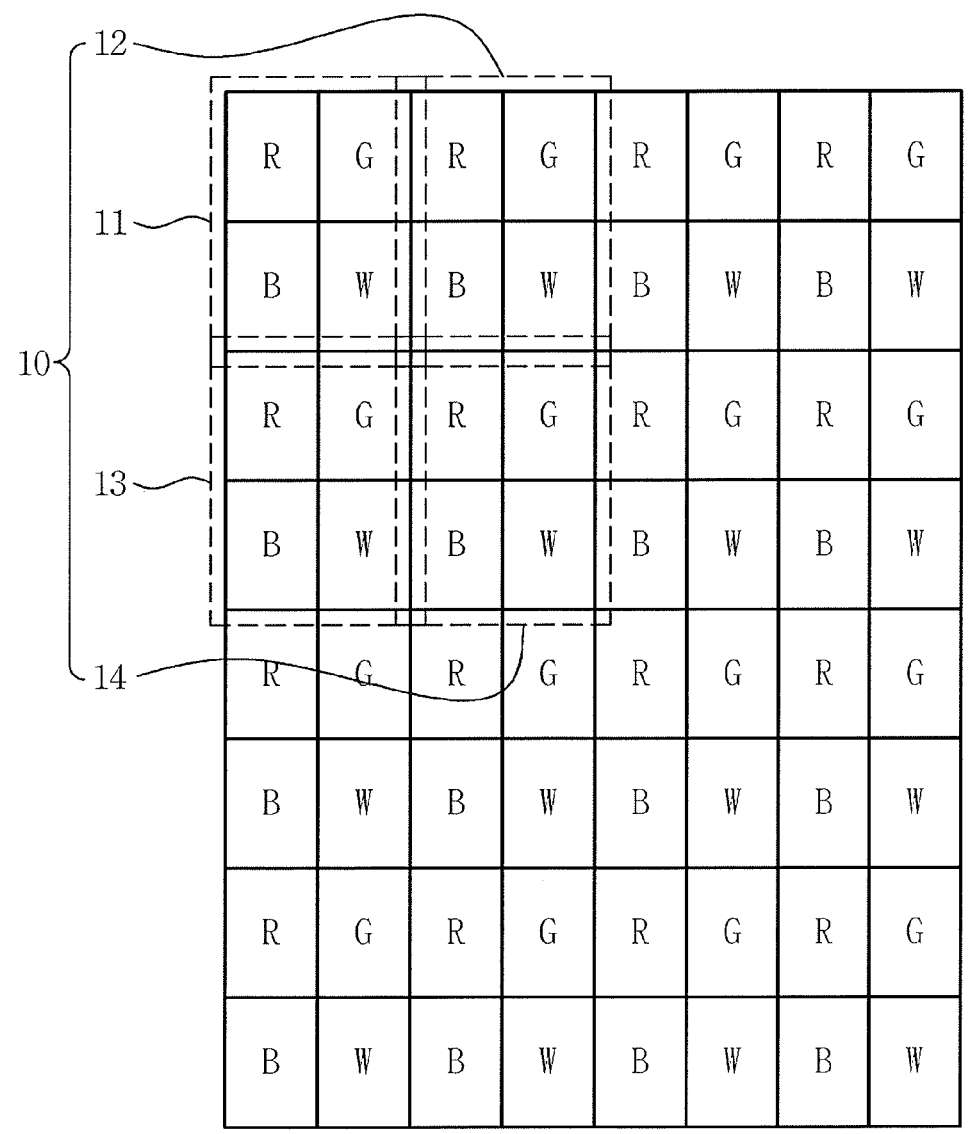
FIG. 12 illustrates a schematic plan view of an array of a plurality of pixels according to an exemplary embodiment.

FIG. 12 illustrates a schematic plan view of an array of a plurality of pixels according to an exemplary embodiment. Referring to FIG. 12, a display device according to an exemplary embodiment may have a pixel array structure different from that described in the exemplary embodiment of FIG. 1. As illustrated in FIG. 12, a plurality of pixels 10 may be arranged. Horizontally adjacent ones and vertically adjacent ones of the pixels 10 may have the same matrix structure as one another. For example, the pixels 10 may include a first pixel 11, a second pixel 12, a third pixel 13, and a fourth pixel 14. With respect to the first pixel 11, the second pixel 12 may be disposed at the right side thereof, the third pixel 13 may be disposed at the lower side thereof, and the fourth pixel 14 may be disposed diagonally thereto.

In the pixel array structure described hereinabove, blue pixels B may be disposed at the left and right sides of a white pixel W, respectively, and green pixels G may be disposed at the upper and lower sides of the white pixel W, respectively. As described in the exemplary embodiment of FIG. 1, a color filter may overlap a portion of the white pixel W, the white pixel W being adjacent to the color filter.

Figure 13:
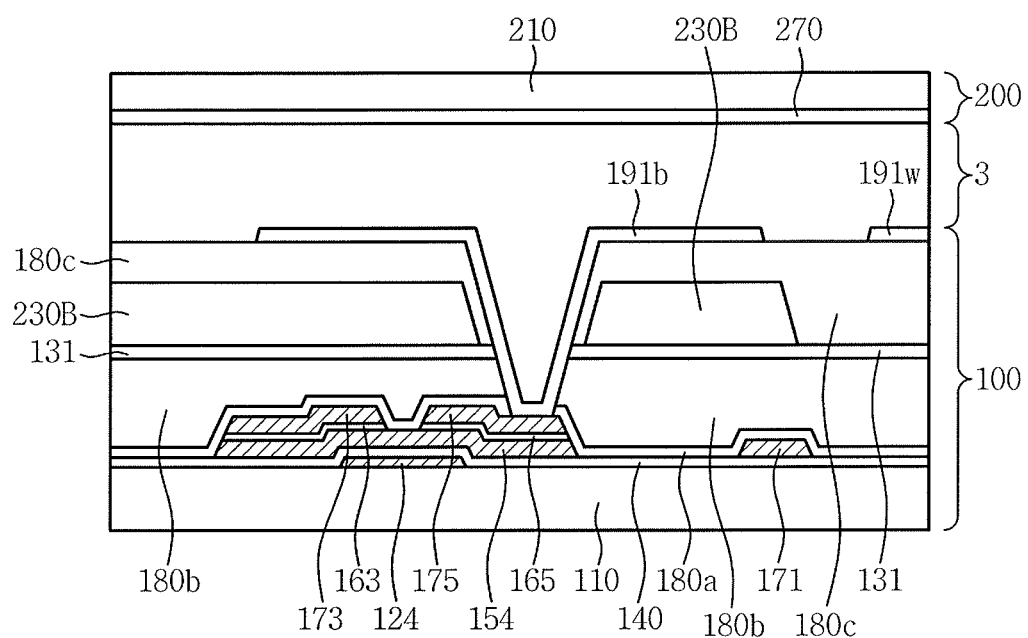
FIG. 13 illustrates a schematic cross-sectional view of a display device according to an exemplary embodiment.

FIG. 13 illustrates a schematic cross-sectional view of a display device according to an exemplary embodiment. Referring to FIGS. 1 and 13, in the display device according to an exemplary embodiment, a color filter 230 may be disposed on a first substrate 110. In an exemplary embodiment, the display device may have the same configurations and dispositions of a thin film transistor, a gate line 121, a data line 171, a gate insulating layer 140, a first insulating layer 180a, and a second insulating layer 180b as those described in the exemplary embodiment of FIG. 1.

A reflective layer 131 may be disposed on the second insulating layer 180b. The reflective layer 131 may be disposed, e.g., continuously, over an entire surface of the first substrate 110, except for a contact hole 185 (refer to FIG. 2) through which a drain electrode 175 may be exposed, and the reflectance of ambient light may be increased. The reflective layer 131 may be disposed between the color filter 230 and the second insulating layer 180b. The reflective layer 131 may include a reflective metal, e.g., aluminum (Al), silver (Ag), chromium (Cr), or an alloy thereof.

The reflective layer 131 may reflect ambient light incident thereon, without being connected to a signal line, e.g., without being connected to the gate line 121 or the data line 171.

For example, the reflective layer 131 may have an unevenness on a surface thereof, and the reflectance of ambient light incident thereon may be increased.

The color filter 230 may be disposed on the reflective layer 131. The color filters 230 may be disposed in corresponding ones of color pixels, respectively.

A third insulating layer 180c may be disposed on the reflective layer 131 and the color filter 230. The third insulating layer 180c may include an inorganic insulating layer, and may prevent external exposure of a component of the color filter 230, or may prevent deformation or discoloration of the color filter 230.

In an exemplary embodiment, the pixel electrode 191 may include a transparent conductive electrode in a manner dissimilar to that described in the exemplary embodiment of FIG. 1. The reflective layer 131 may reflect ambient light, in lieu of the pixel electrode 191. The pixel electrode 191 may include a transparent conductive material, e.g., ITO or IZO.

The display device according to the exemplary embodiment of FIG. 13 may have the same configuration and the same effects as those described in the exemplary embodiment of FIG. 1.

In accordance with one or more of the aforementioned embodiments, a red color filter, a green color filter, and a blue color filter, respectively, may overlap portions of a white pixel, the white pixel being adjacent thereto, and the color reproduction capability of a display device may be enhanced.

By way of summation and review, a four-color pixel structure may enhance luminance and resolution by adding a white pixel to a three-color pixel structure including red, green, and blue pixels, and reflective display devices may have a four-color pixel structure. Reflective display devices in which a black matrix is removed to increase an aperture ratio and reflection efficiency may be manufactured.

However, an alignment error may occur in color filters of the reflective display device absent the black matrix, and color reproducibility may decrease due to, for example, the combination of white light and colored light.

One or more embodiments described herein relate to a reflective display device, which may increase color reproducibility.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
    a first substrate including a plurality of pixels, each pixel including first, second, third, and fourth subpixel regions;
    a second substrate opposing the first substrate; and
    first, second, and third color filters on the second substrate corresponding to the first, second, and third subpixel regions, respectively,
    the first, second, and third color filters respectively extend from the first, second, and third subpixel regions to the fourth subpixel region to respectively overlap portions of the fourth subpixel region, the fourth subpixel region being adjacent to the first, second, and third color filters.

2. The display device as claimed in claim 1, wherein the fourth subpixel region is a transparent subpixel region.

3. The display device as claimed in claim 1, wherein the fourth subpixel region is a white subpixel region.

4. The display device as claimed in claim 1, wherein the first, second, and third color filters have different colors from one another, including red, green, blue, yellow, cyan, or magenta.

5. The display device as claimed in claim 1, wherein an overlapping area between the third color filter and the fourth subpixel region, an overlapping area between the first color filter and the fourth subpixel region, and an overlapping area between the second color filter and the fourth subpixel region are substantially equal to one another.

6. The display device as claimed in claim 1, wherein an overlapping area between the third color filter and the fourth subpixel region is larger than an overlapping area between the first color filter and the fourth subpixel region, and the overlapping area between the first color filter and the fourth subpixel region is larger than an overlapping area between the second color filter and the fourth subpixel region.

7. The display device as claimed in claim 1, wherein:
    the first, second, and third subpixel regions are red, green, and blue subpixel regions, respectively, and
    the first, second, and third color filters are red, green, and blue color filters, respectively.

8. The display device as claimed in claim 7, wherein the first color filter overlaps a portion of the second subpixel region, the second subpixel region being adjacent to the first color filter.

9. The display device as claimed in claim 7, wherein the third color filter overlaps a portion of the first subpixel region, the first subpixel region being adjacent to the third color filter.

10. The display device as claimed in claim 1, further comprising a pixel electrode in each of the first subpixel region, the second subpixel region, the third subpixel region, and the fourth subpixel region.

11. The display device as claimed in claim 10, wherein the first, second, and third color filters, respectively, overlap portions of the pixel electrode in the fourth subpixel region, the fourth subpixel region being adjacent to the first, second, and third color filters.

12. The display device as claimed in claim 11, wherein an overlapping area between the pixel electrode in the fourth subpixel region and each of the first, second, and third color filters is in a range of about 4% to about 47% with respect to an area of the pixel electrode in the fourth subpixel region.

13. The display device as claimed in claim 11, wherein an overlapping area between the third color filter and the pixel electrode in the fourth subpixel region, an overlapping area between the first color filter and the pixel electrode in the fourth subpixel region, and an overlapping area between the second color filter and the pixel electrode in the fourth subpixel region are substantially equal to one another.

14. The display device as claimed in claim 11, wherein an overlapping area between the third color filter and the pixel electrode in the fourth subpixel region is larger than an overlapping area between the first color filter and the pixel electrode in the fourth subpixel region, and the overlapping area between the first color filter and the pixel electrode in the fourth subpixel region is larger than an overlapping area between the second color filter and the pixel electrode in the fourth subpixel region.

15. The display device as claimed in claim 10, wherein the pixel electrode includes a conductive material having reflectivity.

16. The display device as claimed in claim 1, wherein:
the plurality of pixels are arranged in a matrix, the pixels being on the first substrate,
the first, second, third, and fourth subpixel regions are arranged in a 2×2 matrix, and
the first subpixel region and the second subpixel region are sequentially arranged in a first row, and the third subpixel region and the fourth subpixel region are sequentially arranged in a second row, the second row being adjacent to the first row.

17. A display device, comprising:
a first substrate including a plurality of pixels, each pixel including first, second, third, and fourth subpixel regions;
a second substrate opposing the first substrate; and
first, second, and third color filters on the first substrate corresponding to the first, second, and third subpixel regions, respectively,
the first, second, and third color filters respectively extend from the first, second and third subpixel regions to the fourth subpixel region to respectively overlap portions of the fourth subpixel region, the fourth subpixel region being adjacent to the first, second, and third color filters.

18. The display device as claimed in claim 17, further comprising a pixel electrode in each of the first subpixel region, the second subpixel region, the third subpixel region, and the fourth subpixel region.

19. The display device as claimed in claim 18, wherein the first, second, and third color filters, respectively, overlap portions of the pixel electrode in the fourth subpixel region, the fourth subpixel region being adjacent to the first, second, and third color filters.

20. The display device as claimed in claim 19, wherein an overlapping area between the pixel electrode in the fourth subpixel region and each of the first, second, and third color filters is in a range of about 4% to about 47% with respect to an area of the pixel electrode in the fourth subpixel region.

* * * * *